United States Patent
Kawamura

[11] Patent Number: 6,118,194
[45] Date of Patent: Sep. 12, 2000

[54] GENERATOR-CARRYING COGENERATION SYSTEM

[75] Inventor: Hideo Kawamura, Kanagawa-ken, Japan

[73] Assignee: Isuzu Ceramics Research Institute Co., Ltd., Kanagawa-ken, Japan

[21] Appl. No.: 09/027,248

[22] Filed: Feb. 20, 1998

[30] Foreign Application Priority Data

Mar. 3, 1997 [JP] Japan ................... 9-061718

[51] Int. Cl.$^7$ .................. H02K 7/10; H02K 7/02; H02K 7/20; H02K 47/04; G05G 1/00
[52] U.S. Cl. .................. 310/75 R; 310/74; 310/112; 310/113; 74/572; 290/6
[58] Field of Search .................. 310/74 R, 74, 310/80, 83, 94, 99, 101, 112, 113, 114, 153, 156, 118; 74/572, 640, 665 F, 665 G, 665 GA, 665 GB, 665 GC, 665 GE; 318/14, 15; 363/104; 290/4 R, 4 C, 1 C, 1 D, 6; 322/4, 42

[56] References Cited

U.S. PATENT DOCUMENTS

| | | | |
|---|---|---|---|
| 2,463,349 | 3/1949 | Baner | 310/112 |
| 3,445,694 | 5/1969 | Campbell et al. | 310/263 |
| 3,465,185 | 9/1969 | Rollig | 310/112 |
| 3,671,756 | 6/1972 | Meier | 290/54 |
| 4,031,420 | 6/1977 | Carini | 310/74 |
| 4,282,443 | 8/1981 | Seidl | 290/1 K |
| 4,498,357 | 2/1985 | Makarov | 475/267 |
| 4,558,668 | 12/1985 | Yabunaka | 123/195 A |
| 4,691,119 | 9/1987 | McCabria | 307/84 |
| 4,694,654 | 9/1987 | Kawamura | 60/605 |
| 4,779,486 | 10/1988 | Schumacher | 475/5 |
| 4,831,277 | 5/1989 | Christopher | 290/1 A |
| 5,043,617 | 8/1991 | Rostron | 310/112 |
| 5,076,059 | 12/1991 | Okada | 60/608 |
| 5,079,913 | 1/1992 | Kishishita | 60/597 |
| 5,097,165 | 3/1992 | Mashino et al. | 310/112 |
| 5,271,225 | 12/1993 | Adamides | 60/416 |
| 5,279,183 | 1/1994 | Forster et al. | 74/572 |
| 5,387,818 | 2/1995 | Liebowitz | 290/1 R |
| 5,563,463 | 10/1996 | Stark | 310/156 |
| 5,712,519 | 1/1998 | Lamb | 310/95 |
| 5,966,935 | 10/1999 | Liu | 60/413 |

FOREIGN PATENT DOCUMENTS

| | | |
|---|---|---|
| 3622231 | 1/1988 | Germany . |
| 4439550 | 4/1995 | Germany . |
| 60-162977 | 10/1985 | Japan . |
| 62-272850 | 11/1987 | Japan . |
| 2-146975 | 12/1990 | Japan . |
| 7-236260 | 11/1995 | Japan . |

*Primary Examiner*—Nestor Ramirez
*Assistant Examiner*—Dang Dinh Le
*Attorney, Agent, or Firm*—Browdy and Neimark, PLLC

[57] ABSTRACT

This invention provides a cogeneration system formed compactly and provided with a plurality of generators, wherein a plurality of miniaturized generators are coupled to a flywheel provided in an engine. In this cogeneration system, a toothed endless belt is meshed with a toothed portion formed on an outer circumference of the flywheel provided in an engine, and electric power is generated by driving a plurality of generators by the toothed endless belt via speedup gears. The electric power generated by the generators is synthesized and then transformed by a transformer, and the resultant electric power is consumed by a load via a rectifying diode and an inverter.

6 Claims, 3 Drawing Sheets

GENERATOR-CARRYING COGENERATION SYSTEM

BACKGROUND OF THE INVENTION

1. Field of the Invention

This invention relates to a cogeneration system provided with a plurality of generators with respect to an engine.

2. Description of the Prior Art

A conventional large-sized generator driven by an engine comprises mostly an induction machine. When an induction machine is used in a generator, a generated voltage can be set constant easily by controlling the input exciting power even if the rotational frequency varies. Accordingly, such a generator generally comprises an induction machine. A generator or a motor in which a permanent magnet is used as a rotor has characteristics that it has a high level of output and a simple construction, so that it has recently come to be used in large quantities for industrial machines and tools.

However, in a generator, a voltage increases as the rotational frequency thereof increases, and setting the voltage constant is therefore difficult, so that a complicated control apparatus is required. Regarding a rotor in a generator, the rotational frequency thereof increases as the voltage and amperage increase, and, consequently, a large centrifugal force occurs in the rotor. It is necessary that the rotor withstands such a centrifugal force. Therefore, a rotor is generally formed so as to withstand a centrifugal force by fitting a reinforcing ring around an outer circumference of a permanent magnet which constitutes the rotor.

The known generator using a permanent magnet as a rotor include, for example, the miniaturized generator disclosed in Japanese Utility Model Laid-Open No. 146975/1990, the dynamo-electric machine generator disclosed in Japanese Utility Model Laid-Open No. 162977/1985 and the permanent magnet type rotary machine disclosed in Japanese Patent Laid-Open No. 272850/1987.

For example, in the miniaturized generator disclosed in Japanese Utility Model Laid-Open No. 146975/1990, a main shaft and a rotor are connected together via a governor mechanism in which a governor weight is supported pivotably on a pair of links, the governor weight being displaced from the main shaft by a centrifugal force in accordance with a rotational frequency of the main shaft to reduce an angle between the links, whereby the rotor is moved in the direction in which the rotor gets out of a stator.

The high-output AC generator disclosed in Japanese Patent Laid-Open No. 236260/1995 is adapted to control a generation power properly by controlling a magnetic flux density in accordance with a rotation speed. In this generator, a control ring is provided relatively rotatably between a rotor and a stator, and a permeable member which can be engaged with and disengaged from the control ring.

In order to produce a cylindrical permanent magnet by a regularly used method, alloy powder containing elements, such as iron, neodymium, samarium and cobalt is packed in a cylindrical mold comprising a nonmagnetic material, and the alloy powder is compression molded and solidified at a high temperature, a molded body thus obtained being sintered instantaneously with high-frequency heat. During the sintering of the molded body, the NS poles are set, i.e., the magnetic lines of force in the alloy are set by applying a magnetic force thereto. A cylindrical sintered body of a permanent magnet is then taken out from the sintering mold, and the outer and inter circumferential surfaces of the sintered body are ground to make a sintered body of a permanent magnet. On the other hand, a thin-walled outer cylinder formed by winding up elongated carbon fibers is prepared as a member for reinforcing the sintered body. The sintered body of a permanent magnet is then press-fitted in the thin-walled outer cylinder by a press to finish a rotor.

In a generator using a permanent magnet as a rotor, a generated output level is a product of a rotation speed of the rotor and the magnetic field strength. Accordingly, a generated output level increases in proportion to the rotation speed of the rotor. However, it is difficult to increase a generated output level by forming a rotor of a large diameter of a permanent magnet, and thereby increasing a peripheral speed thereof. Namely, as far as a rotor comprising a permanent magnet is employed, the generation of a large output is difficult.

When a rotor is formed by mounting a permanent magnet on an outer circumference of a flywheel, which is mounted on an output end of an engine, with a shaft of the flywheel used as a rotary shaft of the rotor, the permanent magnet becomes large, and a stator necessarily has a large diameter, so that the dimensions of the generator increases. Namely, the diameter of the generator becomes too large, and the generator cannot be installed in certain places. A system for supplying electric power of a high efficiency by using a ceramic insulating turbo compound engine constitutes a very effective system as a power source for an urban area but installing such a system on a roof top or in a basement of a building has also to be taken into consideration. Since the spaces in such places for the installation of this system involve severe conditions, it is demanded that the system be formed to a compact and low-noise structure.

In a generator in which a rotor revolving at a high speed is formed by using a permanent magnet, the powder of an iron-neodymium alloy is sintered, and the resultant sintered body is shaped to a predetermined form and set to a predetermined precision for producing this permanent magnet, in many cases. When a rotor in a generator is rotated at a high speed, a large centrifugal force is exerted thereon. Consequently, it is demanded that a permanent magnet constantly has a strength high enough to prevent the permanent magnet constantly has a strength high enough to prevent the permanent magnet from being bursted by the centrifugal force thereof. Moreover, it is necessary to increase the strength of a permanent magnet in proportion to the dimensions of an object rotor. However, in order to produce a permanent correspondingly to the dimensions of an object rotor, a generator of a high cost is produced, which necessarily poses an issue of how to reduce manufacturing cost.

SUMMARY OF THE INVENTION

An object of the present invention is to provide a cogeneration system having a plurality of generators, capable of being formed to small dimensions owing to the use of a permanent magnet rotated as a rotor and made by sintering powder of iron and neodymium; capable of reducing the dimensions of rotor-carrying generators and the cost of manufacturing the same; capable of generating electric power with a high efficiency by rotating rotary shafts of the generators at an equal speed owing to a high peripheral speed of a flywheel, which is used as a driving wheel, of an engine; capable of being formed compactly at a reduced manufacturing cost, capable of being installed easily even in a place of a limited space in an urban area; and capable of reducing noise owing to the reduce dimensions of the generators.

The present invention relates to a cogeneration system provided with a plurality of generators comprising a flywheel provided in an engine, driving means engaged with an outer circumferential surface of the flywheel and rotated by the flywheel, speedup wheels rotated by the driving means, rotary shafts of a plurality of generators which are rotated via the speedup wheels, a rectification unit for synthesizing the electric power generated by the generators and subjecting the resultant electric power to rectification and transformation, and an inverter for converting a frequency of the synthesized electric power into another.

In this cogeneration system, the driving means comprise gear driving means, the speedup wheels comprising speedup gears, the gear of the gear driving means being meshed with the flywheel and speedup wheels, the speedup gears being driven by the flywheel.

In this cogeneration system, the driving means comprise a belt type driving means, which is formed of a toothed endless belt, the speedup wheels comprising speedup gears, the toothed endless belt being meshed with a toothed portion formed on an outer circumference of the flywheel, the speedup gears being driven by the toothed endless belt. The toothed endless belt is provided on an outer side thereof, which is opposite to the speedup gear-meshed side thereof, with idle rollers engaged with the endless belt.

The rectification unit is formed by spirally winding a plurality of output end portions around an iron core into inductance coils, and adapted to rectify and transform synthesized electric power.

This cogeneration system has a controller for controlling the generators so that the generators can be turned on and off in response to a load.

The rectification unit has a structure in which coils are wound around an iron core, and is adapted to synthesize the electric power generated by a generator in an energy recovering apparatus provided in the engine, and rectify and transform the synthesized electric power.

This generator is provided with a rotor mounted on the above-mentioned rotary shaft and comprising a permanent magnet, and a stator provided on the outer circumferential side of the rotor and fixed to a housing, the rotor comprising a cylindrical member comprising a permanent magnet, and a member provided on an outer circumference of this cylindrical member so as to reinforce the cylindrical member, and comprising a non-magnetic material.

Various kinds of generators can be utilized as generators to be incorporated in this cogeneration system. For example, generators each of which is provided with a rotor comprising a permanent magnet mounted on a rotary shaft, and a stator provided on the outer circumferential side of the rotor and fixed to a housing, the rotor comprising a cylindrical member comprising a permanent magnet, and a member provided on an outer circumferential of this cylindrical member so as to reinforce the cylindrical member, and comprising a non-magnetic material.

In this cogeneration system, the toothed portion provided on the outer circumference of the flywheel is used as a driving unit by utilizing the large diameter of the flywheel, and a plurality of miniaturized generators are provided via speedup members. This enables the system to be formed compactly, and a power generating efficiency to be increased. When rotary shafts of the generators are driven by a driving force of a flywheel via a means, such as a toothed endless belt, a high precision concerning, for example, the meshing of the gears is not demanded, and the manufacturing cost can be reduced.

The cogeneration system provided with a plurality of generators according to the present invention is formed as described above. Therefore, it is possible to drive a plurality of generators by utilizing the peripheral speed of the flywheel provided in an engine, form the system compactly, and increase the level of generated power owing to the utilization of the high peripheral speed of the flywheel. Moreover, since the generators can be formed to small dimensions, it becomes possible to reduce the manufacturing cost, prevent the breakage of the permanent magnet by reducing the centrifugal force occurring therein, and reduce the noise. Since this cogeneration system can be formed compactly as mentioned above, it can be installed easily in, for example, a city or urban area, and even in a small space, such as a rooftop and a basement of a building.

DESCRIPTION OF THE PREFERRED EMBODIMENT

Figure 1:
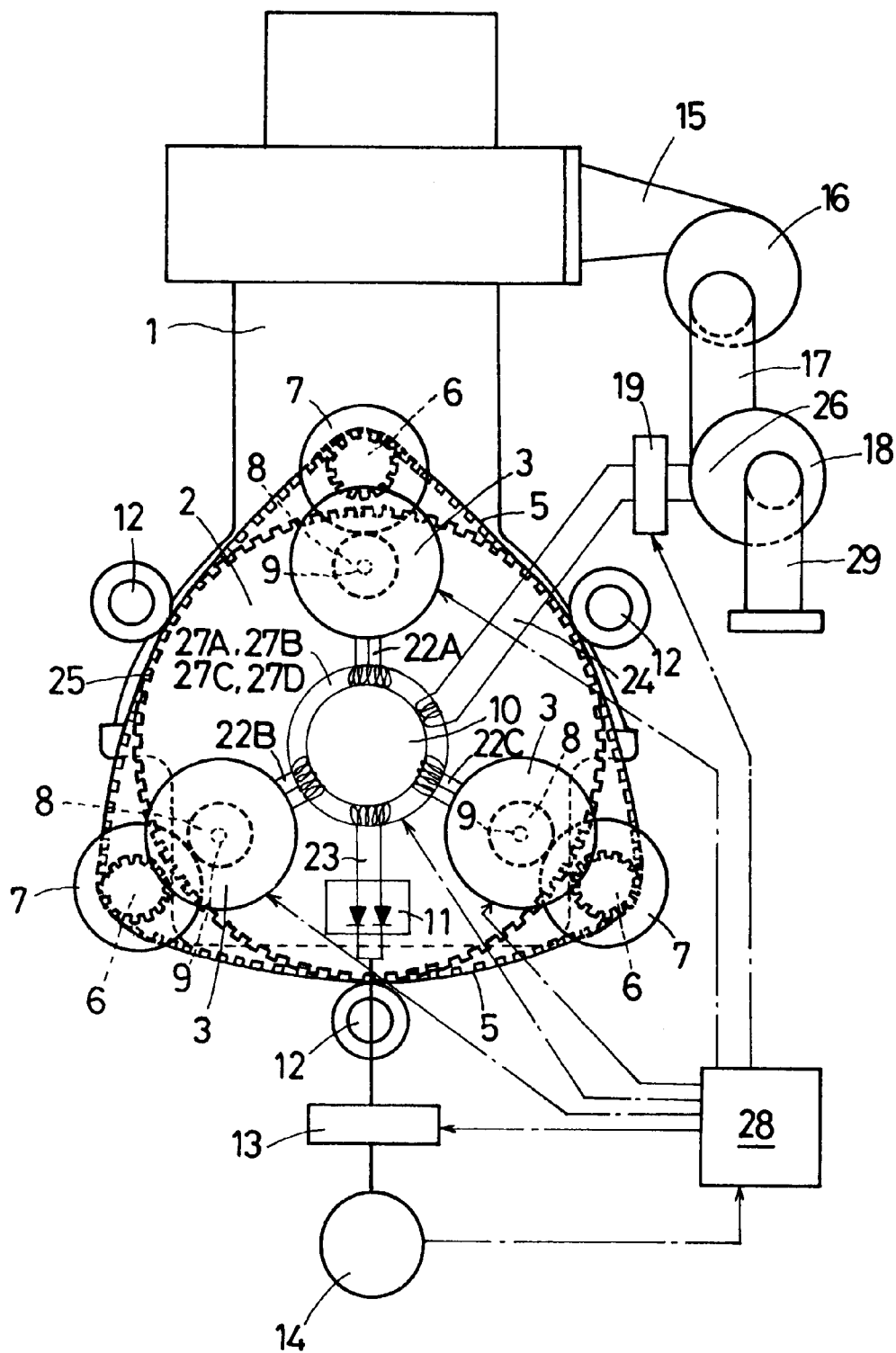
FIG. 1 is a front view showing an embodiment of the cogeneration system provided with a plurality of generators according to the present invention.
Figure 2:
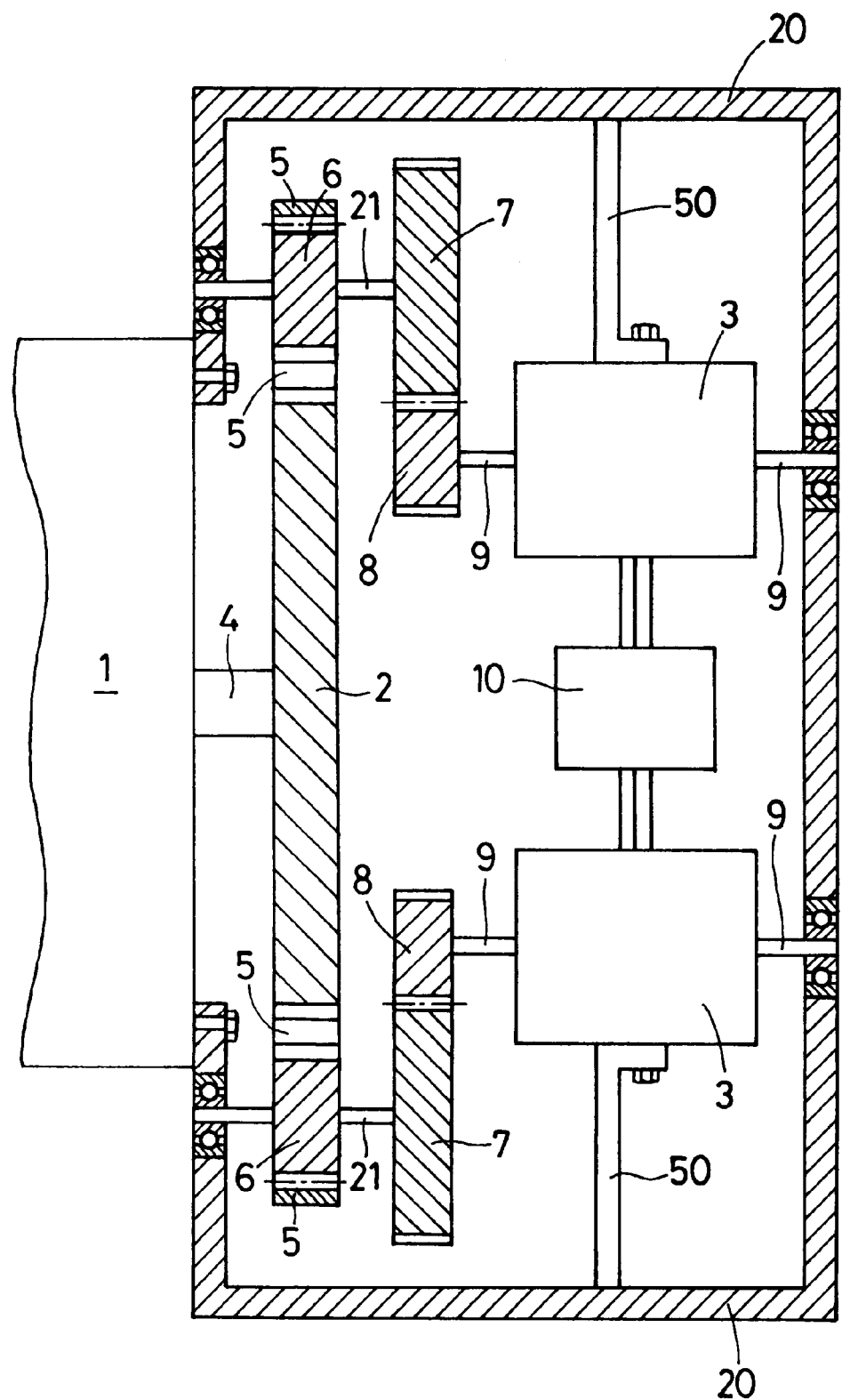
FIG. 2 is a partially sectioned side view of the cogeneration system of FIG. 1.

An embodiment of the cogeneration system provided with a plurality of generators according to the present invention will now be described with reference to the drawings.

In the cogeneration system provided with a plurality of generators according to the present invention, the rotational force of an engine 1 is transmitted to rotary shafts 9 of a plurality of generators 3 via a flywheel 2, and electric power is generated by the generators 3. This embodiment is provided with three generator 3. The engine 1 in use can comprise a diesel engine using, for example, light oil, heavy oil or a natural gas as a fuel. The engine 1 has mainly a flywheel 2 as a large-diameter driving shaft connected to an output shaft 4, a turbocharger 16 driven by an exhaust gas discharged from the engine 1 through a discharge pipe 15, and an energy recovery unit 18 driven by an exhaust gas from a discharge pipe 17 of the turbocharger 16. The energy recovery unit 18 is provided with a turbine and a generator 26, and can convert the exhaust gas energy into electric power. An exhaust gas discharged from the energy recovery unit 18 is discharged to the outside through a discharged pipe 29 with the thermal energy sufficiently recovered therefrom.

This cogeneration system comprises mainly the flywheel 2 provided in the engine 1, a gear driving means or a belt type driving means meshed with and rotating the flywheel 2, a plurality of (three in the embodiment of FIG. 1) speedup wheels rotated by the gear driving means or belt type driving means, rotary shafts 9 of the three generators 3 which are rotated via the speedup wheels, a rectification unit 10 for synthesizing the electric power generated by the generators 3, and rectify the transform the synthesized electric power, and an inverter 13 for converting the frequency of the synthesized electric power into another. The rectification unit 10 comprises an inductance coil unit adapted to rectify and transform the electric power generated in a plurality of places. The electric power outputted from the inverter 13 is consumed by a load 14. The belt type driving means can be formed of a flat belt or a toothed endless belt 5 shown in the drawings. The toothed endless belt 5 can be formed by providing a toothed portion on a belt member, and fixing end portions of the resultant belt member together to obtain an endless belt.

This cogeneration system is provided with a controller 28 for controlling the driving condition of the generators 3 so that the generators 3 can be turned on and off in accordance with the load 14, and the rectification unit 10 is formed so as to synthesize the electric power produced by the generator 26 of the energy recovery unit 18 provided in the engine 1, and transform the resultant electric power. The controller 28 is capable of having properly selected generators among the three generators 3 operated in accordance with the load 14 by which the electric power is consumed. When the three generators 3 are fully driven, the cogeneration system is put in a fully loaded operational condition.

In this cogeneration system, lead wires 22A, 22B, 22C drawn from the generators 3 are wound up around a plurality of iron cores 27A, 27B, 27C of an inductance coil unit, i.e., the rectification unit 10, while a lead wire 24 drawn from the generator 26 of the energy recovery unit 18 is wound up around one iron core 27D of the transformer 10 via a regulator 19.

In the inductance coil unit, i.e. the rectification unit 10, a total of four iron cores 27A, 27B, 27C, 27D including concretely the three iron cores 27A, 27B, 27C around which the coils connected to the lead wires 22A, 22B, 22C respectively from the three generators 3 are wound up, and one iron core 27D around which the coil connected to the lead wire 24 from the generator 26 is wound up are provided in parallel (these iron cores are shown in a piled state in FIG. 1), and a coil comprising the same wire is wound up around the four iron cores 27A, 27B, 27C, 27D and drawn out as a lead wire 23, which is connected to a rectifying diode 11.

The regulator 19 is adapted to put a varying voltage in order, and has a function of regulating a voltage, which varies, for example, between 100 V and 400 V, of the electric power produced by the generator 26 to a uniform level of 400 V. The electric power generated by the generators 3 is regulated to smooth voltage and amperage in the inductance coil unit 10. In the inductance coil unit, i.e. the rectification unit 10, the output lead wire 23 is connected to the respective iron cores 27A, 27B, 27C, 27D, and also to the frequency converting inverter 13 via the rectifying diode 11. The inverter 13 is adapted to convert the frequency of the generated electric power to 50 or 60 cycles and output the resultant electric power to the load 14.

In this cogeneration system, a toothed portion 25 is formed on an outer circumference of the flywheel 2, and a driving means by a gear or belt type driving can be used. In this embodiment, a belt type driving means is used as the driving means. A toothed endless belt 5 is used as the belt type driving means, and speedup gears 6, 7, 8 as speedup wheels. The toothed endless belt 5 is meshed with the toothed portion 25 of the flywheel 2, and speedup gears 6 are meshed with the toothed endless belt 5. The toothed endless belt 5 can be made, for example, by forming a belt member provided with a toothed portion 25, fusing together both ends of the belt member having the toothed portion 25 so as to from an endless belt with the toothed portion 25 positioned on the inner side thereof, and then subjecting the toothed portion 25 to high-frequency hardening or nitriding. Idle rollers 12 are provided on the outer side of the toothed endless belt 5, i.e., on the side thereof which is opposite to a meshing side thereof with respect to the speedup gears 6, so as to retain the meshing of the toothed endless belt 5 with the speedup gears 6 and the toothed portion 25 of the flywheel 2 in an excellent condition. The idle rollers 12 are rotatably fixed to a housing 20, though the details are not illustrated.

In this cogeneration system, the generators 3 are fixed via frames 50 to the portions of the inside of the housing 20 secured to a body of the engine 1 which are in the vicinity of the apexes of an imaginary equilateral triangle. One end of each of the rotary shafts 9 of the generators 3 is rotatably supported on the housing 20, and speedup gears 8 are fixed to the other end portions thereof. The speedup gears 6 are supported rotatably at one end of each of their rotary shafts 21 on the housing 20, and speedup gears 7 are fixed to the other end portions thereof. The speedup gears 7, 8 are meshed with each other so that a rotational force is transmitted from the speedup gears 7 to the speedup gears 8. Accordingly, the rotational force of the engine 1 is transmitted from the output shaft 4 comprising a crankshaft to the flywheel 2, and then from the flywheel 2 to the speedup gears 6 via the toothed endless belt 5. The rotational force of the speedup gears 6 is transmitted from the speedup gears 7 to the rotary shafts 9 of the generators 3 via the speedup gears 8.

Figure 3:
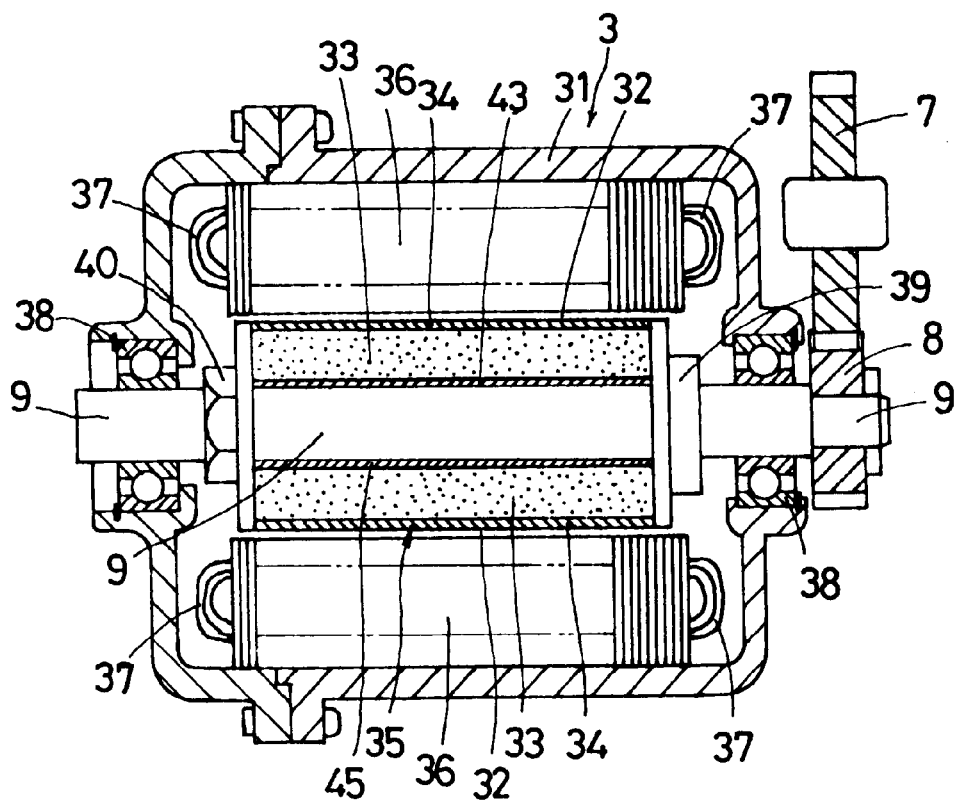
FIG. 3 is a sectional view showing a generator incorporated in the cogeneration system of FIG. 1.
Figure 4:
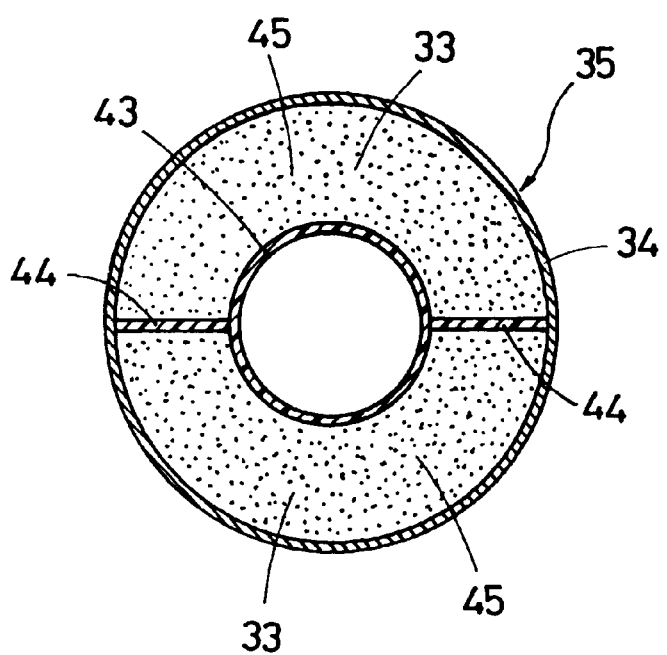
FIG. 4 is a sectional view of a rotor of the generator of FIG. 3.

The generators 3 incorporated in this cogeneration system can comprise various types of miniaturized generators, for example, generators formed as high-speed generators the construction of which is shown in FIGS. 3 and 4.

Each generator 3 has rotary shafts 9 supported rotatably on a housing 31 via a pair of bearings 38, a rotor 35 mounted fixedly on the rotary shafts 9, and stators 36 provided on the outer circumferential side of the rotor 35 and fixed to the housing 31 with clearances 32 formed between the rotor and stators. The rotor 35 is engaged at one end thereof with a stopper 39 mounted on the rotary shaft 9, and fixed at the other end to the rotary shaft 9 by a fixing nut 40 screwed on the rotary shaft 2. The speedup gear 8 is mounted fixedly on one end portion of the rotary shaft 9, and the input speedup gear 7 is meshed with the speedup gears 8. Each stator 36 is formed by winding stator coils 37 around laminated thin plates.

As shown in FIG. 4, the rotor 35 comprises a cylindrical body 33 formed by assembling segment members 45 of permanent magnets together into a cylindrical structure, an outer cylinder 34 wound up around an outer circumference of the cylindrical body 33 and formed by solidifying carbon fiber with a resin material, an inner cylinder 43 provided on an inner circumference of the cylindrical body 33 and formed of a carbon fiber-containing resin material, and boundary members 44 interposed between the adjacent segment members 45 and formed of a carbon fiber-containing resin material. The resin material contained in the inner cylinder 43 and boundary members 44 can comprise the same plastic, i.e. the same resin material as is contained in the outer cylinder 34. The cylindrical body 33 shown as an example comprises a two-divided cylindrical body. The cylindrical body 33 can also be formed in a three-divided manner, or in a not less than four-divided manner.

In the resin material constituting the inner cylinder 43 positioned on the inner circumference of the segment members 45 and the boundary members 44 positioned between the adjacent segment members 45, a ceramic fiber material of a high thermal conductivity, such as AlN or SiC is mixed so as to increase the strength and thermal conductivity of these parts. Aluminum or an alloy thereof is fused to a boundary portion between the outer cylinder 34 and cylindrical body 33, and a boundary portion between the cylindrical body 33 and inner cylinder 43, whereby the fixing of the two parts on both sides of the boundary portions is done reliably with the radiation of heat carried out excellently. The inner cylinder 43 and boundary members 44 contain iron powder for the purpose of increasing the permeability thereof.

In this cogeneration system, the rotor 35 in each generator includes the outer cylinder 34, inner cylinder 43 and boundary members 44 each of which comprises a resin material and has a thickness of resin portions larger than that of at least grinding margins. Similarly, when an aluminum material is used for the outer cylinder 34, the thickness of an aluminum portion is set larger than that of at least a grinding margin. Accordingly, the segment members 45 can be ground to a predetermined size easily and speedily with a high precision, so that the cylindrical body 33 of a high precision can be formed by assembling such segment members 45. Also, not only the outer cylinder 34 of a rotor 35 but also the inner cylinder 43 can be ground to a predetermined size easily and speedily with a high precision, whereby a rotor 35 of a high precision can be obtained.

What is claimed is:

1. A cogeneration system provided with generators, comprising a flywheel provided in an engine, driving means engaged with an outer circumferential surface of said flywheel and rotated by said flywheel, speedup wheels rotated by said driving means, rotary shafts of generators which are rotated via said speedup wheels, a rectification unit for synthesizing the electric power generated by said generators and subjecting the resultant electric power to rectification, an inverter for converting a frequency of said synthesized electric power into another;

wherein said driving means comprise a toothed endless belt, said speedup wheels comprising speedup gears, said toothed endless belt being meshed with a toothed portion formed on an outer circumference of said flywheel, said speedup gears being driven by said toothed endless belt; and wherein said toothed endless belt is provided on an outer side thereof, which is opposite to the speedup gear-meshed side thereof, with idle rollers engaged with said endless belt.

2. The cogeneration system provided with generators according to claim 1, wherein said driving means comprise gear driving means, said speedup wheels comprising speedup gears, the gear of said gear driving means being meshed with said flywheel and said speedup wheels, said speedup gears being driven by said flywheel.

3. The cogeneration system provided with generators according to claim 1, wherein said rectification unit is formed by spirally winding output end portions around an iron core into inductance coils, and adapted to carry out the rectification of said synthesized electric power.

4. The cogeneration system provided with generators according to claim 1, wherein said generators are controlled to be turned on and off in response to a load of said engine.

5. The cogeneration system provided with generators according to claim 1, wherein said rectification unit is adapted to synthesize the electric power generated by a generator in an energy recovery unit provided in said engine, and transform the resultant electric power.

6. The cogeneration system provided with generators according to claim 1, wherein each of said generators is provided with a rotor mounted on said rotary shaft and comprising a permanent magnet, and a stator provided on an outer circumferential side of said rotor and fixed to a housing, said rotor comprising a cylindrical member comprising a permanent magnet, and a member provided on an outer circumference of said cylindrical member so as to reinforce said cylindrical member and a comprising a non-magnetic material.

* * * * *